US011654591B2

(12) United States Patent
Muilwijk et al.

(10) Patent No.: US 11,654,591 B2
(45) Date of Patent: May 23, 2023

(54) TAPE SECTIONING SYSTEM AND METHOD OF SECTIONING TAPE

(71) Applicant: Airborne International B.V., The Hague (NL)

(72) Inventors: Mark Muilwijk, Barendrecht (NL); Thomas Theodorus Arnoldus Van Overbeek, Delft (NL); Anders Brødsjø, Delft (NL)

(73) Assignee: Airborne International B.V., Gravenhage (NL)

( * ) Notice: Subject to any disclaimer, the term of this patent is extended or adjusted under 35 U.S.C. 154(b) by 0 days.

(21) Appl. No.: 15/733,442

(22) PCT Filed: Jan. 31, 2019

(86) PCT No.: PCT/NL2019/050062
§ 371 (c)(1),
(2) Date: Jul. 30, 2020

(87) PCT Pub. No.: WO2019/151859
PCT Pub. Date: Aug. 8, 2019

(65) Prior Publication Data
US 2021/0101302 A1      Apr. 8, 2021

(30) Foreign Application Priority Data

Jan. 31, 2018    (NL) ...................... 2020361

(51) Int. Cl.
*B26D 5/00*  (2006.01)
*G05B 19/418*  (2006.01)

(52) U.S. Cl.
CPC ............. *B26D 5/007* (2013.01); *B26D 5/005* (2013.01); *G05B 19/41875* (2013.01)

(58) Field of Classification Search
CPC .. B26D 5/005; B26D 5/007; G05B 19/41875; Y02P 90/02; Y02P 80/40; Y02P 80/30; B29C 70/386
(Continued)

(56) References Cited

U.S. PATENT DOCUMENTS

| 517,558 A | * | 4/1894 | Ward | G07B 17/00193 226/137 |
| 3,760,667 A | * | 9/1973 | Maxey | B27L 5/08 83/365 |

(Continued)

FOREIGN PATENT DOCUMENTS

| CN | 101236426 A | 8/2008 |
| CN | 103979148 A | 8/2014 |

(Continued)

OTHER PUBLICATIONS

International Search Report from PCT/NL2019/050062 dated Jun. 7, 2019.
(Continued)

*Primary Examiner* — Ghassem Alie
(74) *Attorney, Agent, or Firm* — Adsero IP

(57) ABSTRACT

A tape sectioning system, comprising a tape web feed path for feeding a web of fiber reinforced tape, a quality inspection system arranged along the web feed path that inspects the quality of the web of tape, and a sectioner that sections off longitudinal tape sections from the web of tape, wherein the sectioner is arranged to vary the length of the tape
(Continued)

sections that are sectioned off from the web of tape based on the outcome of the quality inspection.

14 Claims, 3 Drawing Sheets

(58) Field of Classification Search
USPC .......................................................... 83/76.8
See application file for complete search history.

(56) References Cited

U.S. PATENT DOCUMENTS

| | | | |
|---|---|---|---|
| 4,781,090 A * | 11/1988 | Feldkamper | B26D 5/34 83/365 |
| 4,934,228 A * | 6/1990 | Bolton | B07C 5/361 156/64 |
| 4,976,089 A * | 12/1990 | Reichelt | B65B 57/04 83/100 |
| 5,425,834 A | 6/1995 | Masaru et al. | |
| 6,520,057 B1 | 2/2003 | Steadman | |
| 2003/0230178 A1* | 12/2003 | Steadman | D06H 3/08 83/13 |
| 2007/0095451 A1 | 5/2007 | Kramp | |
| 2014/0299253 A1* | 10/2014 | Minamida | G01N 21/8806 156/64 |
| 2015/0367622 A1 | 12/2015 | Adachi | |

FOREIGN PATENT DOCUMENTS

| | | |
|---|---|---|
| CN | 104461682 A | 3/2015 |
| CN | 205067380 U | 3/2016 |
| CN | 106796183 A | 5/2017 |
| CN | 104999504 A | 10/2017 |
| CN | 206594081 U | 10/2017 |
| DE | 4209496 | 9/1993 |
| EP | 2730914 A1 | 5/2014 |
| EP | 2730914 A1 | 5/2014 |
| JP | H05-009898 U | 5/2005 |
| JP | 2010-260159 A | 11/2010 |
| JP | 2013-108058 A | 6/2013 |
| JP | 2015-102376 A | 6/2015 |
| TW | 201632869 A | 9/2016 |
| WO | WO 1999/016595 | 4/1999 |
| WO | WO 2014/185100 | 11/2014 |
| WO | WO 2017/019680 | 2/2017 |

OTHER PUBLICATIONS

Japanese Office Action, Japanese Application No. 2020-541968, Japanese Patent Office, dated Dec. 27, 2022, English translation provided.

* cited by examiner

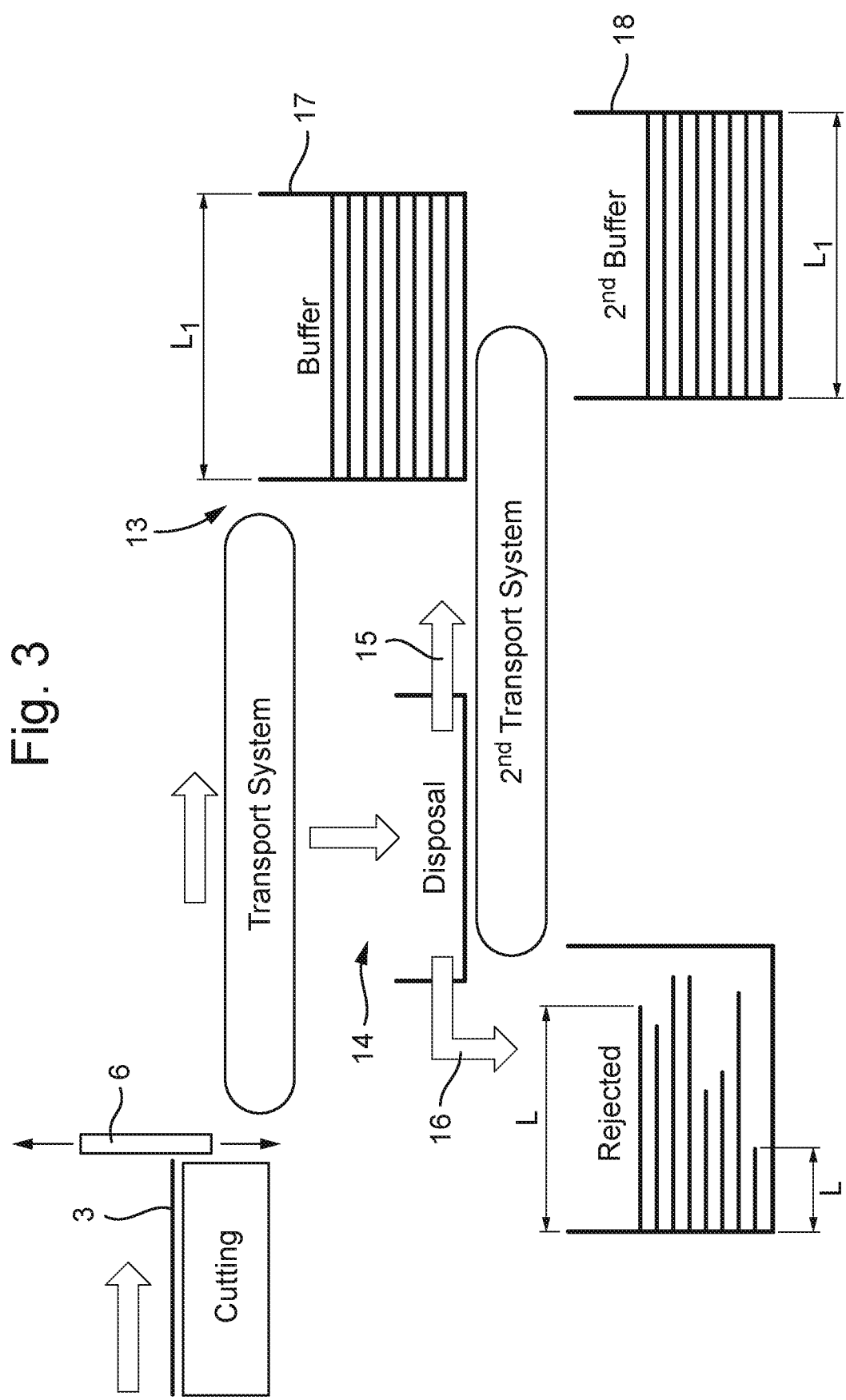

TAPE SECTIONING SYSTEM AND METHOD OF SECTIONING TAPE

RELATED APPLICATIONS

This application is a 35 U.S.C. § 371 national phase application of PCT/NL2019/050062 (WO 2019/151859), filed on Jan. 31, 2019, entitled "Tape Sectioning System and Method of Sectioning Tape", which application claims the benefit of Netherland Application No. 2020361, filed Jan. 31, 2018, which is incorporated herein by reference in its entirety.

The invention generally relates to cutting sheets of fiber reinforced material, and in particular to sectioning sheets from fiber reinforced tape, e.g. an anisotropic unidirectional (LTD) tape.

Such sheets or 'plies' can be used for manufacturing fiber reinforced composite products. The fiber reinforced material can be supplied on relatively long and narrow tapes that are rolled up on a roll. Such tapes may e.g. be produced by impregnating a planar layer of parallel, longitudinally extending continuous fibers with a matrix material. The fibers may e.g. include carbon fibers, aramid fibers or other types of reinforcement fibers, and the matrix material may e.g. include thermosetting resin, or thermoplastic plastics material. The fiber reinforced material may be dry, but may also be wet or impregnated. In addition, the cut or sectioned sheets may comprise a backing material.

Rolls of this fiber reinforced material, in particular relatively expensive UD tape, may be uncoiled and sections of tape or plies may be cut or sectioned from a web of uncoiled tape, e.g. transversely along the width of the relatively narrow tape, to form a sheet. The sheets can be cut or sectioned off perpendicularly to the length of the tape, so that the cut or sectioned sheets have a substantially rectangular shape.

The sheets or plies themselves are unfinished products: they are to be stacked in layers in a stack. To form finished products, the sheets can be subjected to further processing steps, such as buffering or restacking into a stack of sheets having mutually differing orientations. A stack of sheets can then be subjected to a laminating or consolidating process, where the stacked sheets are subjected to heat and/or pressure to form a laminated product, in particular a high strength, light weight consolidated fiber reinforced product.

The quality of a produced roll of fiber reinforced composite tape can vary along its length. Defects in the tape, such as contamination, seams, breaks, voids, visual defects and inconsistent dimensions in for example width and thickness, are inherent to the tape production process. These defects impact the quality of section of the tape. Therefore, commonly up to approximately 10% of direct material loss may be expected in the cut plies due to the presence of defects. The UD tape is relatively expensive, in particular the material cost is relatively expensive compared to the manufacturing process of laminated products. Furthermore, the quality of a section of tape can depend on the nature, size and distribution of the defect. Cut sheets of tape comprising defects can be stacked and subsequently may be subjected to a laminating or consolidating process. The presence of a cut sheet comprising a defect in the consolidated fiber reinforced product may lead to rejection of the product, for example may lead to the rejection of a 10-20 ply product. Hence, indirect material loss due to rejection of products comprising sheets with defects can be approximately 10% or more.

The invention aims to mitigate at least some of the above mentioned drawbacks. In particular, the invention aims to provide a system for cutting plies with which the use of material may be optimized, the cost efficiency of the manufacturing process can be increased, and/or the processing time can be shortened.

Thereto, the invention provides for a tape sectioning system in particular according to claim 1, comprising a tape web feed path for feeding a web of fiber reinforced tape, a quality inspection system for assessing the quality of the web of tape arranged along the web feed path, and a sectioner arranged to separate longitudinal tape sections from the web of tape arranged at the end of the tape web feed path, wherein the sectioner is arranged to vary the length of the tape sections that are separated based on the quality of the tape.

By arranging a quality inspection system along a web feed path, the quality or integrity of the web of tape can be assessed and defects can be identified. The quality inspection system can include nondestructive inspection devices such as cameras e.g. for visual inspection of the tape's surface, laser devices e.g. to measure the thickness and width of the web of tape, acoustic or sonic devices e.g. for ultrasonic testing, and radiographic devices e.g. for x-ray and/or neutron inspection of internal details of the web of tape. Identified defects can be flagged, for example by coupling the identified defect to a tape coordinate. By further arranging the sectioner to vary the length of the sections of tape that are sectioned off from the tape web, the tape sectioning system can cut or section the tape before and after the defect. Thereby, a section of tape comprising a defect that might need to be rejected or discarded, may be of minimal longitudinal length and the material loss can be reduced. The sectioner may thus be arranged to vary the sections of tape in longitudinal size, in particular in real time, responsive to quality variations of the tape in the web. This way, the sectioner may be configured to produce sections of tape, in particular rectangular sections of tape, of at least two different lengths, each section corresponding to a different quality due to a difference in presence of defects in the tape sections. The sheets can be of various shapes. They can be cut or sectioned off perpendicularly to the length of the tape, so that the cut or sectioned sheets have a substantially rectangular shape. Such sheets are preferred. However, the sheets can also be cut or sectioned off obliquely to the length of the tape, so as to form a sheet that is shaped as a triangle, trapezoid or parallelepiped, and the sheets can also be cut or sectioned off with a curved cutting line. Also, the sheets may be cut out in any shape from a web of material, e.g. using a numerically controlled cutter. It is of course also possible, by using rolls of tape having off-axis fiber orientations or cross-ply tape, to cut or section off sheets with correspondingly different fiber orientations.

The tape sectioning system may be arranged to separate sections of tape from the web of tape that are of a first quality, and that are of other quality. This way, tape sections of a first quality may be kept separate from sections of tape that are of other quality.

When the tape sectioning system comprises a first discharge path for sections of tape of the first quality, and a further discharge path for sections of tape of other quality, the tape sections may be separated based on their quality, before they are stacked and/or buffered. This facilitates convenient discarding of sections of tape of other quality that have defects and which are not viable for use in the laminated product. In case the tape is separated based on its quality before stacking and/or buffering, it can be achieved that stacks of a first quality are easily obtained and e.g. substantially free of defects. Tape sections of other quality may used in a different way, or may be discarded.

By providing tape sections of the first quality that are of equal predetermined length, it can be achieved that such plies may be used in a stack of plies that are of the same length, while being of known quality. This way, they may e.g. be placed at locations in the stack that require the first quality, e.g. a top sheet in the stack that must be free of defects in view of its appearance and/or mechanical load. By providing tape sections of other quality that include tape sections of different length and in particular of shorter/smaller length than the tape sections of the first quality, it can be achieved that material loss due to defects in the tape can be further reduced.

By providing the further discharge path with a second discharge path for sections of tape of a second quality and a third discharge path for sections of tape of other quality, sections of tape that contain defects and have a second quality that is still viable for use in the product can be salvaged from the roll of tape. In this way, tape sections of second quality that would normally be discarded can be recovered. The tape sections of second quality are cut to the predetermined length, or in other words are of equal length as the tape sections of the first quality, which further reduces material loss and increases cost effectiveness. Properties of the fused, consolidated or laminated product depend on the order of the tape sections, in particular the order and/or position of sheets in the laminated product e.g. adjacent sheets having mutually differing fiber orientations. Hence, the position of a viable section of tape of second quality may be based on the requirements of the finished product, such as the visual quality or strength requirements. Tape sections of second quality can e.g. be utilized closer to the plane of symmetry in a set or stack of plies or closer to the centerline in for example non-symmetric consolidated or laminated products.

The tape sections in the third discharge path may include tape sections of mutually different quality and mutually different length. This way, disposal of scrap or material to be discarded can be facilitated, and the length of tape to be discarded may be kept to a minimum.

The first discharge path may lead to a first buffer arranged for buffering tape sections of mutually equal predetermined length. This way, sections of tape of first quality can be stacked and registered for further processing to ensure the finished product meets a minimum threshold that is required by the specifications.

The second discharge path may in turn lead to a second buffer arranged for buffering tape sections of mutually equal length. This way, sections of tape of second quality may be stacked and registered, waiting for opportunities to be used in further processing to ensure the finished product meets a minimum threshold that is required by the specifications.

The tape sectioning system may further include a tape supply, in particular a tape supply comprising one or more rolls of tape. The tape sectioning system may also include one or more uncoiling device for uncoiling the tape from a roll into the tape web feed path. The tape sectioning system may include a splicer for joining the end of the tape end of a first roll to the tape beginning of a second roll so as to allow continuous operation, and to allow further optimization of the use of the tape. Such a splicer may include a tape buffer so as to allow the tape end of a first roll and the tape beginning of a second roll to be joined while keeping the process stationary.

The invention further relates to a method of sectioning tapes comprising feeding a web of fiber reinforced tape, assessing the quality of the web of tape, and sectioning off longitudinal tape sections from the web of tape, wherein the length of the tape sections that are sectioned off from the web of tape are varied based on the assessment of the quality of the web of tape.

Further advantageous aspects of the invention are set out in the description and appended claims.

It will be clear to the skilled person that the technical features of the present tape sectioning system elucidated in the above paragraphs can be advantageously used for sectioning tapes not only each alone but also in any possible combination. The technical features described in the paragraphs can be isolated from the context, and the isolated technical features from the different paragraphs can be combined. Such combinations are herewith specifically disclosed in this description.

The invention will be further elucidated on the basis of a non limiting exemplary embodiment, which is represented in the drawings. In the drawings:

FIG. 3 shows a schematic view of a tape sectioning process in which tape sections are sectioned from a web of tape that are of a first quality, and that are of other quality.

It is noted that the drawings are only schematic representations of a preferred embodiment of the invention. In the drawings, identical or corresponding parts are represented with the same reference numerals.

Figure 1:
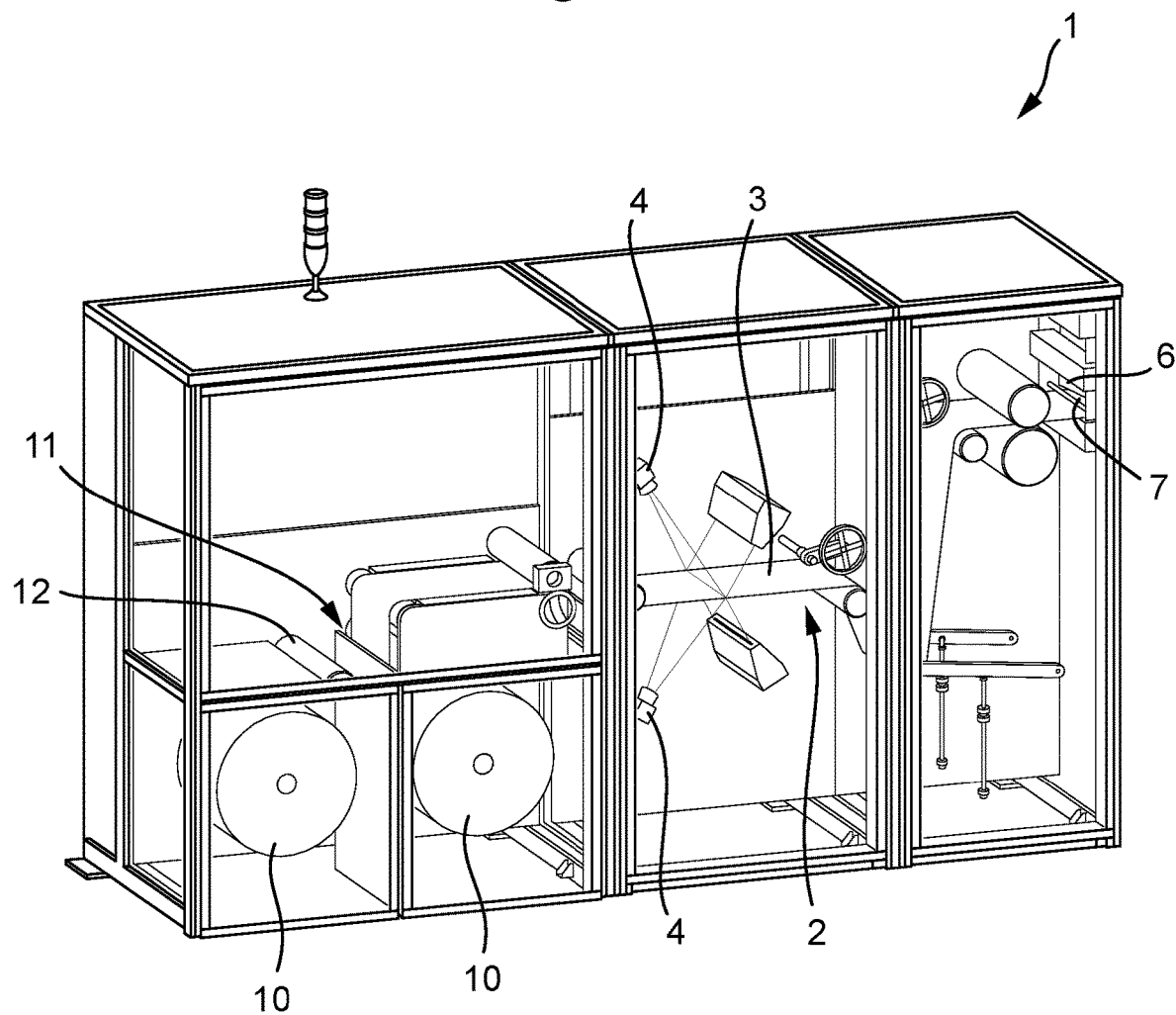
FIG. 1 shows a schematic perspective view of a type sectioning system.
Figure 2:
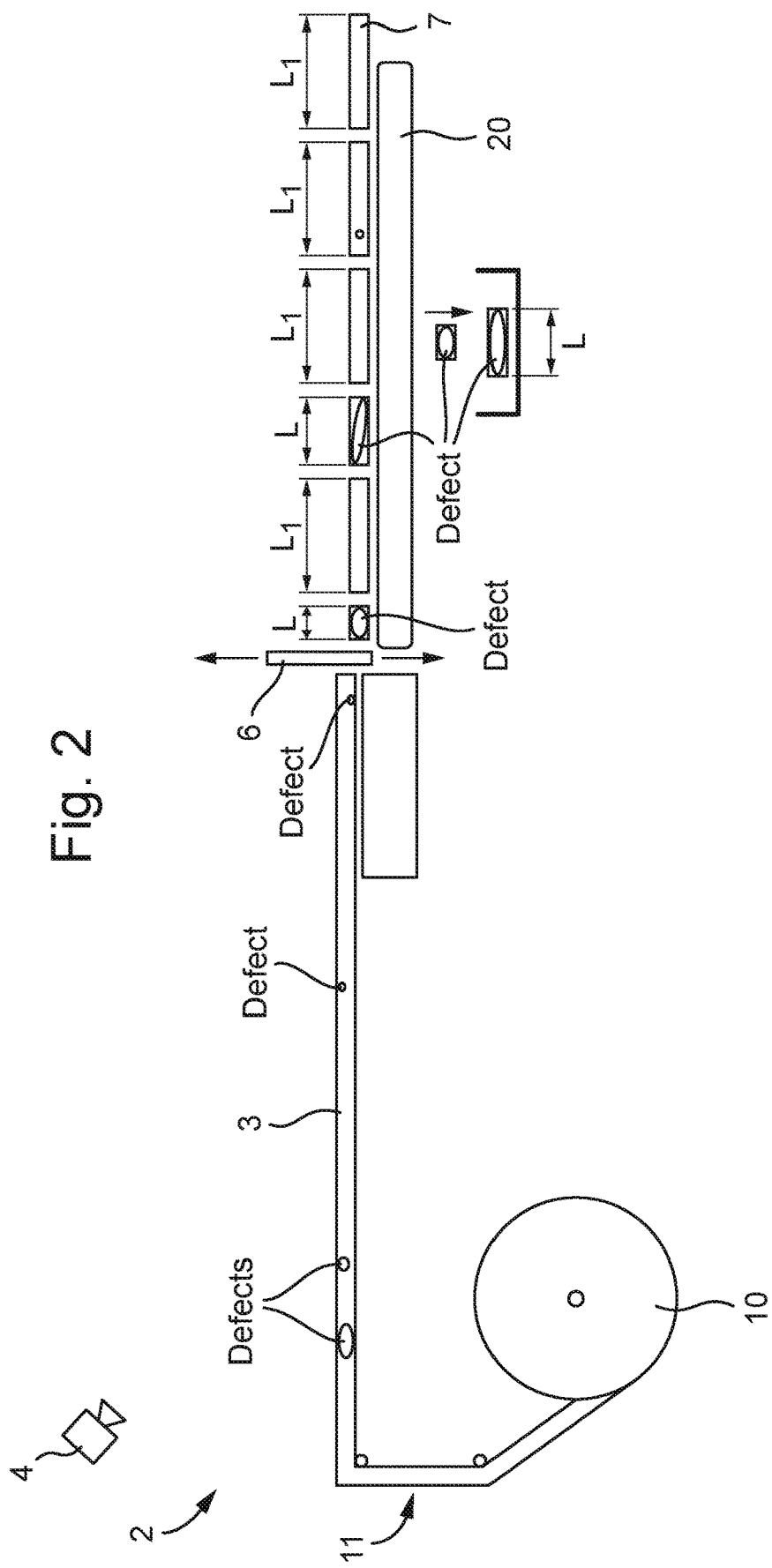
FIG. 2 shows a schematic side view of a web of tape being uncoiled from a roll of tape, and the web of tape being sectioned into sections of varying length.

Referring to FIG. 1, a tape sectioning system 1 comprises a tape web feed path 2 for feeding a web of fiber reinforced tape 3, in particular fiber reinforced tape, such as unidirectional (UD) tape. A quality inspection system 4 for assessing the quality of the web of tape 3 is arranged along the web feed path 2. A sectioner 6 is arranged to separate longitudinal tape sections 7 from the web of tape 3. The sectioner 6 is arranged at the end of the tape web feed path 2. The sectioner 6 is further arranged to vary the length of the tape sections 7 that are separated based on the quality of the tape. The sectioner 6 is arranged to vary the length of the tape sections 7 that are separated based on the quality of the tape. The quality inspection system 4 assess the quality of the web of tape 3, before it is sectioned into separate tape sections 7 by the sectioner 6. For example, the optical quality, the surface integrity, the thickness, the width, the composition etc. which are features that represent quality aspects of the tape that, if not in accordance with a desired standard, may constitute defects. Here, the quality inspection system 4 comprises cameras for visual inspection of the surface quality of a web of tape 3. As can be seen in FIG. 1, the tape sectioning system 1 further comprises a roll of tape 10. The roll of tape 10 is uncoiled by an uncoiling device 11. Here the tape sectioning device 1 is provided with two rolls of tape 10 and a splicer 12 that enables a continuous uncoiling process, which has the added benefit of increasing the throughput of tape in the tape sectioning system 1. The tape is uncoiled into a tape web feed path 2 for feeding a web of fiber reinforced tape 3 to the sectioner 6. The sectioner 6 for instance cuts with a knife, laser or (water)jet. The sectioner 6 can be dynamic or stationary, that is to say moving along with the tape web of not. Varying the length of tape sections 7 in this way can reduce scrap and optimize the use of material. Thereby, the cost efficiency of the manufacturing process can be increased. In other words, a tape sectioning system 1 is disclosed, comprising a tape web feed path 2 for feeding a web 3 of fiber reinforced tape, and a quality inspection system 4 arranged along the web feed path 2 that inspects the web 3 of tape, in particular for occurrence of defects, as well as a sectioner 6 arranged at the end of the tape web feed path 2 that sections longitudinal tape sections 7 from the web 3 of tape. The sectioner 6 is arranged to vary the length of the tape sections 7 that are sectioned off from the web 3 of tape based on the outcome of the quality inspection, in particular based on a difference in presence of defects in the tape sections. Referring to FIG. 2, the sectioner 6 of the tape sectioning system 1 according to an embodiment of the invention is arranged to separate tape sections 7 from the web of tape 3 that are of a first quality, and that are of other quality. The tape sections 7 of first quality are cut to a predetermined length $L_1$. The tape sections 7 of the first quality are of equal predetermined length $L_1$. The tape sections 7 of other quality include tape sections of different length L than the tape sections 7 of the first quality. As shown in FIGS. 2 and 3, the tape sectioning system 1 comprises a first discharge path 13 for sections of tape 7 of the first quality, and a further discharge path 14 for sections of tape 7 of other quality. Here, the sectioner 6 is arranged to section the tape sections 7 of the first quality at equal predetermined length $L_1$. An adjustable web feed path length is used here to vary the speed at which tape is fed to the sectioner 6 and to be able to section the tape sections 7 to the desired length, such as the predetermined length $L_1$ and the different length L. However, the speed of the web feed path 2 can also be varied, for example by providing a brake on the uncoiling device 11 of the tape sectioning system. The quality inspection system 4 is arranged for recognizing defects in the tape along the web feed path 2, such that the tape is sectioned before and after the defect by the sectioner 6 downstream of the inspection system 4. Hence, tape sections 7 of other quality include tape sections 7 that are of smaller length than the tape sections 7 of the first quality.

Referring to FIG. 3, the further discharge path 14 of the tape sectioning system 1 according to an embodiment of the invention comprises a second discharge path 15 for sections of tape 7 of a second quality and a third discharge path 16 for sections of tape 7 of other quality. In this way, tape sections 7 of a viable quality to be used in the laminated product further reduces scrap material and optimizes material use. Thereby, further increasing the cost efficiency of the manufacturing process. Hence, sections of tape 7 of a second quality are of equal length as the tape sections 7 of the first quality, i.e. predetermined length $L_1$. The third discharge path 16 includes tape sections 7 of mutually different quality and mutually different length L. Tape sections 7 of other quality are discarded as scrap. As illustrated in FIGS. 1 and 3, the first discharge path 13 of the tape sectioning system 1 leads to a first buffer 17 arranged for buffering tape sections 7 of mutually equal predetermined length $L_1$. The second discharge path 15 leads to a second buffer 18 arranged for buffering tape sections 7 of mutually equal predetermined length $L_1$.

As for the scope of this disclosure, it is pointed out that technical features which have been specifically described may be susceptible of a functional generalization. Furthermore, it is pointed out that—as far as not explicitly indicated—such technical features can be seen separately from the context of the given exemplary embodiment, and furthermore can be seen separately from the technical features with which they cooperate in the context of the example.

As for the scope of protection, it is pointed out that the invention is not limited to the exemplary embodiment represented here, and that many variants are possible. For example, other ways for varying the length at which the tape is sectioned may be used than discussed in the example. Such variants will be clear to the skilled person and are understood to fall within the scope of the invention as set forth in the following claims.

LIST OF REFERENCE SIGNS 1. tape sectioning system
2. web feed path
3. web of fiber reinforced tape/web of tape
4. quality inspection system
6. sectioner
7. tape section/section of tape
10. roll of tape
11. uncoiling device
12. splitter
13. first discharge path
14. further discharge path
15. second discharge path
16. third discharge path
17. first buffer
18. second buffer

The invention claimed is:

1. A tape sectioning system, comprising a tape supply comprising a roll of fiber reinforced tape, the tape of the roll of fiber reinforced tape being an anisotropic unidirectional tape comprising a planar layer of parallel, longitudinally extending continuous fibers in a matrix material, the tape sectioning system further comprising a tape web feed path feeding the web of fiber reinforced tape from the roll of fiber reinforced tape, a quality inspection system arranged along the web feed path that inspects the quality of the web of tape, and a sectioner that sections off longitudinal tape sections from the web of tape, wherein the sectioner is arranged to vary the length of the tape sections that are sectioned off from the web of tape based on the outcome of the quality inspection system, wherein the quality inspection system is arranged to inspect an entire width of both sides of the web of fiber reinforced tape.

2. The tape sectioning system of claim 1, further comprising a splicer for joining an end of the fiber reinforced tape end of a first roll to a tape beginning of a second roll of fiber reinforced tape so as to allow continuous operation.

3. The tape section system of claim 1, wherein the quality inspection system inspects the quality of the web of tape by inspecting at least one of an optical quality, surface integrity, thickness, width and composition of the web of tape.

4. The tape section system of claim 1, wherein tape of the other quality comprise a viable section of tape of a second quality that is of sufficient quality for use in production of a final product.

5. The tape sectioning system according to claim 1, wherein the sectioner is arranged to separate tape sections from the web of tape that are of a first quality, and that are of other quality.

6. The tape sectioning system according to claim 5, comprising a first discharge path for sections of tape of the first quality, and a further discharge path for sections of tape of other quality.

7. The tape sectioning system of claim 5, wherein the tape sections of the first quality are of equal length, and wherein the tape sections of other quality include tape sections of different length than the tape sections of the first quality.

8. The tape sectioning system of claim 7, wherein the tape sections of other quality include tape sections that are of smaller length than the tape sections of the first quality.

9. The tape sectioning system according to claim 6, wherein the further discharge path comprises a second discharge path for sections of tape of a second quality, and a third discharge path for sections of tape of other quality.

10. The tape sectioning system according to claim 9, wherein the tape sections of the second quality are of equal length as the tape sections of the first quality.

11. The tape sectioning system according to claim 10, wherein the third discharge path includes tape sections of mutually different quality and mutually different length.

12. The tape sectioning system according to claim 6, wherein the first discharge path leads to a first buffer arranged for buffering tape sections of mutually equal length.

13. The tape sectioning system according to claim 9, wherein the second discharge path leads to a second buffer arranged for buffering tape sections of mutually equal length.

14. The tape sectioning system of claim 7 wherein the tape sections of the first quality are each of a predetermined equal length.

* * * * *